US009133865B2

(12) United States Patent
Pawelski

(10) Patent No.: US 9,133,865 B2
(45) **Date of Patent: *Sep. 15, 2015**

(54) POSITION CONTROL APPARATUS

(75) Inventor: Joseph W. Pawelski, Fort Collins, CO (US)

(73) Assignee: Flexibility Engineering, LLC, Loveland, CO (US)

( * ) Notice: Subject to any disclaimer, the term of this patent is extended or adjusted under 35 U.S.C. 154(b) by 556 days.

This patent is subject to a terminal disclaimer.

(21) Appl. No.: 13/420,368

(22) Filed: Mar. 14, 2012

(65) Prior Publication Data

US 2012/0168284 A1 Jul. 5, 2012

Related U.S. Application Data

(63) Continuation-in-part of application No. 13/417,021, filed on Mar. 9, 2012, now abandoned, which is a continuation of application No. 12/124,033, filed on May 20, 2008, now Pat. No. 8,132,665.

(51) Int. Cl.
*B65G 21/20* (2006.01)
*F15B 15/14* (2006.01)

(52) U.S. Cl.
CPC ........ *F15B 15/1404* (2013.01); *B65G 21/2072* (2013.01); *F15B 15/1476* (2013.01)

(58) Field of Classification Search
USPC ............................... 198/836.3, 836.1; 406/88
See application file for complete search history.

(56) References Cited

U.S. PATENT DOCUMENTS

| | | | |
|---|---|---|---|
| 1,929,707 | A | 10/1933 | Mojonnier |
| 2,095,820 | A | 10/1937 | Lenz |
| 2,484,603 | A | 10/1949 | Audemar |
| 2,603,340 | A | 7/1952 | Warren et al. |
| 2,799,414 | A | 7/1957 | Streckfuss |
| 3,367,534 | A | 2/1968 | Carter, III |
| 3,592,002 | A | 7/1971 | Alduk |
| 3,612,297 | A | 10/1971 | Lapostolet |
| 3,647,051 | A | 3/1972 | Didas |
| 3,687,059 | A | 8/1972 | Plattner et al. |
| 3,776,350 | A | 12/1973 | Tice |
| 3,897,877 | A | 8/1975 | VanderMeer et al. |
| 3,918,598 | A | 11/1975 | VanderMeer et al. |

(Continued)

OTHER PUBLICATIONS

Parallel U.S. Appl. No. 13/417,021, Office action dated Apr. 23, 2012.

(Continued)

*Primary Examiner* — Joseph Dillon, Jr.
(74) *Attorney, Agent, or Firm* — Santangelo Law Offices, P.C.

(57) ABSTRACT

Particular embodiments of the inventive technology may be described as a position control apparatus capable of moving at least one side guide component of an item conveyance system to any of a plurality of component positions, as desired, within a component position range. The apparatus may comprise a fluidic drive system configured to drive, with a single fluidic displacement, a plurality of positioners in a first relative direction; and a bias system that includes a plurality of biasers that bias the positioners in a direction that is opposite the first relative direction. The bias system may include at least one biaser for every positioner, and the apparatus may enable adjustment of the positioners to a plurality of positions within a positioner range. The positioners may effect positioning, as desired, of the at least one component to a desired component position within the component position range.

60 Claims, 16 Drawing Sheets

(56) References Cited

U.S. PATENT DOCUMENTS

| | | | |
|---|---|---|---|
| 4,154,347 | A | 5/1979 | VanderMeer et al. |
| 4,251,979 | A | 2/1981 | Horigome et al. |
| 4,259,826 | A | 4/1981 | Campbell |
| 4,264,002 | A | 4/1981 | Van Der Schie |
| 4,277,932 | A | 7/1981 | Campbell |
| 4,401,205 | A | 8/1983 | Komossa et al. |
| 4,406,359 | A | 9/1983 | Cole et al. |
| 4,500,229 | A | 2/1985 | Cole et al. |
| 4,515,503 | A | 5/1985 | Snowdon |
| 4,715,748 | A | 12/1987 | Krambrock |
| 4,747,252 | A | 5/1988 | Kapke |
| 4,753,564 | A | 6/1988 | Pearce et al. |
| 4,759,673 | A | 7/1988 | Pearce et al. |
| 4,802,571 | A | 2/1989 | Born et al. |
| 4,809,965 | A | 3/1989 | VanderMeer et al. |
| 4,828,434 | A | 5/1989 | Fairman et al. |
| 4,829,743 | A | 5/1989 | Kapke |
| 4,829,744 | A | 5/1989 | Kapke |
| 4,843,797 | A | 7/1989 | Butterly, Jr. et al. |
| 4,887,719 | A | 12/1989 | Kapke |
| 4,909,676 | A | 3/1990 | Heep et al. |
| 4,934,508 | A | 6/1990 | VanderMeet et al. |
| 4,990,034 | A | 2/1991 | Kapke et al. |
| 5,004,400 | A | 4/1991 | Handke |
| 5,071,289 | A | 12/1991 | Spivak |
| 5,074,608 | A | 12/1991 | Gabriel |
| 5,099,979 | A | 3/1992 | Kehrel |
| 5,145,253 | A | 9/1992 | Paul et al. |
| 5,161,919 | A | 11/1992 | Smith et al. |
| 5,206,039 | A | 4/1993 | Valyi |
| 5,211,280 | A | 5/1993 | Houde |
| 5,222,840 | A | 6/1993 | Ingraham et al. |
| 5,237,906 | A | 8/1993 | Raymond |
| 5,271,709 | A | 12/1993 | VanderMeer et al. |
| 5,273,152 | A | 12/1993 | Brun |
| 5,310,307 | A | 5/1994 | VanderMeer et al. |
| 5,320,457 | A | 6/1994 | VanderMeer et al. |
| 5,322,160 | A | 6/1994 | Markiewicz et al. |
| 5,407,305 | A | 4/1995 | Wallace |
| 5,437,533 | A | 8/1995 | VanderMeer et al. |
| 5,492,218 | A | 2/1996 | Falkowski |
| 5,494,150 | A | 2/1996 | McDonell et al. |
| 5,501,552 | A | 3/1996 | Simkowski |
| 5,501,553 | A | 3/1996 | Simkowski |
| 5,522,692 | A | 6/1996 | Simkowski |
| 5,542,789 | A | 8/1996 | Aidlin et al. |
| 5,555,700 | A | 9/1996 | Marti |
| 5,558,200 | A | 9/1996 | Whitby et al. |
| 5,566,816 | A | 10/1996 | Gross et al. |
| 5,570,977 | A | 11/1996 | Simkowski et al. |
| 5,630,679 | A | 5/1997 | Simkowski et al. |
| 5,682,976 | A | 11/1997 | Jorgensen |
| 5,699,896 | A | 12/1997 | Spada et al. |
| 5,716,189 | A | 2/1998 | Winski et al. |
| 5,733,090 | A | 3/1998 | Fuke et al. |
| 5,733,100 | A | 3/1998 | Slat et al. |
| 5,746,572 | A | 5/1998 | Winski |
| 5,762,794 | A | 6/1998 | Simkowski et al. |
| 5,794,790 | A | 8/1998 | Bonnet |
| 5,803,703 | A | 9/1998 | Winski |
| 5,819,907 | A | 10/1998 | Simkowski |
| 5,819,911 | A | 10/1998 | Ledingham |
| 5,842,818 | A | 12/1998 | Simkowski |
| 5,927,480 | A | 7/1999 | McCaffrey et al. |
| 5,961,275 | A | 10/1999 | Winski et al. |
| 5,967,295 | A | 10/1999 | Ledingham |
| 6,000,884 | A | 12/1999 | Ingraham |
| 6,003,662 | A | 12/1999 | McCaffrey et al. |
| 6,135,271 | A | 10/2000 | Ledingham |
| 6,190,094 | B1 | 2/2001 | Rediess et al. |
| 6,196,788 | B1 | 3/2001 | Talbot et al. |
| 6,209,707 | B1 | 4/2001 | Ronchi |
| 6,241,072 | B1 | 6/2001 | Ingraham |
| 6,305,528 | B1 | 10/2001 | Leonard |
| 6,309,144 | B1 | 10/2001 | Igraham |
| 6,318,935 | B1 | 11/2001 | Ouellette |
| 6,332,740 | B1 | 12/2001 | Bernard et al. |
| 6,389,341 | B1 | 5/2002 | Davis |
| 6,408,740 | B1 | 6/2002 | Holt et al. |
| 2,634,167 | A1 | 8/2002 | Bible |
| 6,431,817 | B1 | 8/2002 | Simkowski |
| 6,514,015 | B1 | 2/2003 | Trenel et al. |
| 6,533,110 | B1 | 3/2003 | Ledingham |
| 6,578,702 | B2 | 6/2003 | Falkowski |
| 6,589,008 | B1 | 7/2003 | Ingraham |
| 6,685,401 | B1 | 2/2004 | de Almeida et al. |
| 6,827,203 | B2 | 12/2004 | Andreoli et al. |
| 6,827,205 | B2 | 12/2004 | Ledingham |
| 6,886,841 | B2 | 5/2005 | Coombs et al. |
| 6,957,533 | B1 | 10/2005 | Olsson |
| 7,085,636 | B2 | 8/2006 | Song et al. |
| 7,104,180 | B2 | 9/2006 | Hall et al. |
| 7,152,405 | B2 | 12/2006 | Friedsam et al. |
| 7,210,572 | B2 | 5/2007 | Ingraham |
| 7,717,254 | B2 | 5/2010 | Brackley et al. |
| 7,721,876 | B2 | 5/2010 | Hartness et al. |
| 7,735,636 | B2 | 6/2010 | Lundberg |
| 7,815,041 | B2 | 10/2010 | Guenther |
| 7,887,064 | B2 | 2/2011 | Inoue |
| 7,891,484 | B2 | 2/2011 | Ranger |
| 8,132,665 | B2 | 3/2012 | Pawelski |
| 8,931,631 | B2 * | 1/2015 | Vasse et al. ................ 198/836.3 |
| 2002/0192038 | A1 | 12/2002 | Trenel et al. |
| 2003/0164280 | A1 | 9/2003 | Delaporte et al. |
| 2003/0205447 | A1 | 11/2003 | Ledingham |
| 2007/0095247 | A1 | 5/2007 | Ingraham |
| 2009/0288725 | A1 | 11/2009 | Pawelski |

OTHER PUBLICATIONS

U.S. Appl. No. 13/417,021, filed Mar. 9, 2012.

* cited by examiner 140
120
123
124
124

EXTRUDED BODY
WITH MOUNTING
T SLOTS
140
128
122
120
126

123
9
132
VENT
131
124
129
EXTRUDED
BODY
120

125
PARALLEL
BIAS FORCE
127
151
126
INTERNAL PISTON
130
CONTROL PRESSURE 1.25
126
127
3.13
6.00
0.50
18.74
7.25
128
129
144
2.50
3.00
4.12
6.49
159
5.56
122
165
17.21
120
0.50
25.29
6.64
2.08
4.50

EFFICIENCY = (12.0-9.75)/9.75 = 23%

EFFICIENCY = (7.5-4.5)/4.5 = 67%

EFFICIENCY = (10.5-4.5)/4.5 = 133%

EFFICIENCY = (16.5-4.5)/4.5 = 267%
120
140

POSITION CONTROL APPARATUS

I. PRIORITY CLAIM

This application is a continuation-in-part of, and claims benefit of and priority to U.S. patent application Ser. No. 13/417,021, filed Mar. 9, 2012, which itself is a continuation of, and claims benefit of and priority to, U.S. patent application Ser. No. 12/124,033, filed May 20, 2008 (published as publication number US 2009/0288725 A1 on Nov. 26, 2009 and issued as U.S. Pat. No. 8,132,665 on Mar. 13, 2012), said applications hereby incorporated herein by reference in their entirety.

II. BACKGROUND OF THE INVENTION

The need to accurately position—and reposition as a new application may require—one or more items for proper operation of systems and apparatus has been known in several industries for years. Perhaps the most well known such position control apparatus is a side guide position control apparatus, which find application in the bottling industry to maintain proper position of containers (bottles or cans, as but two examples) as they travel along a conveyor during processing (filling, capping, etc.). A similar type of position control apparatus may operates as part of a palletizing system to maintain the proper position of pallets as they travel along a conveyor, whether for pallet manufacture or pallet loading. Position control apparatus may also find application as part of a differential valve controller, an HVAC mixing control system (as a substitute for expensive blowers) and a programmable vehicle suspension system (where ground clearance is controlled), as but three of many examples. Indeed, the inventive position control apparatus disclosed and claimed herein may be used to control the position of components of a system, where such components may benefit from repeated monitoring and adjustment to assure proper positioning (e.g., during a single "run" on a single bottle size) and/or, particularly in systems that are usable to process differently sized items (e.g., bottles of different sizes), where components need to have their position adjusted before a specific "run" (e.g., on a different bottle size), depending on the size of an item processed during that "run."

There have been attempts in the past to provide position control systems that repeatedly monitor and accurately adjust component(s) to assure proper positioning and/or facilitate adjustments necessitated by the different size of an item processed during a specific "run." However, such systems appear prohibitively costly, unnecessarily complex, and/or simply do not afford all the benefits afforded by the inventive technology.

III. SUMMARY OF THE INVENTION

Particular embodiments of the inventive technology may be described as a position control apparatus that comprises a fluidic drive system configured to drive, with a single fluidic displacement, each of a plurality of positioners in a first relative direction; and a bias system that includes a plurality of biasers that bias the positioners in a direction that is opposite the first relative direction. Particular embodiments of the inventive position control apparatus technology may be described as comprising a fluidic drive system that comprises a fluid compressor and a plurality of positioner actuators fluidicly linked in parallel and with the fluid compressor; a piston in each of the positioner actuators; and a plurality of positioners, each of which is responsive to (e.g., moved by) at least one of the pistons, wherein the drive system is configured to drive the piston in a first relative direction, and wherein the apparatus further comprises a plurality of biasers, each of which is configured to bias at least one of the positioners in a direction opposite the first relative direction. Particular embodiments may achieve high operational efficiency due to, e.g., spring placement relative to a piston containing space.

As mentioned, advantages of certain embodiments of the inventive technology relate to reduced cost and decreased complexity. Other perhaps more specific advantages of particular embodiments of the inventive technology disclosed and claimed herein include, but are not necessarily limited to: in certain embodiments, high operational efficiency, stabilization, due to biasers, of torque from weight of side rails allowing for use of fewer actuators; in certain embodiments, bias force helps overcome "breakaway" force of the cylinder seal; in certain embodiments, preclusion of need to manually adjust side guides when necessary; in certain embodiments, length of air conveyor systems requires low cost per actuator; in certain embodiments, inaccessibility of air conveyor systems may result in high reliability; in certain embodiments, comparatively few or no wires; in certain embodiments, comparatively few or no mechanical connections; in certain embodiments, one control point for numerous actuators; in certain embodiments, flexible tubing enhances simplicity of design and facilitates set-up; and, in certain embodiments, pneumatic back pressure results in small forces as applied to side rails (and thus reduced tendency of flexure under high forces). Of course, other advantages of the inventive technology may be disclosed in the remainder of the specification, including the claims.

IV. BRIEF DESCRIPTION OF THE DRAWINGS

Figure 7A:
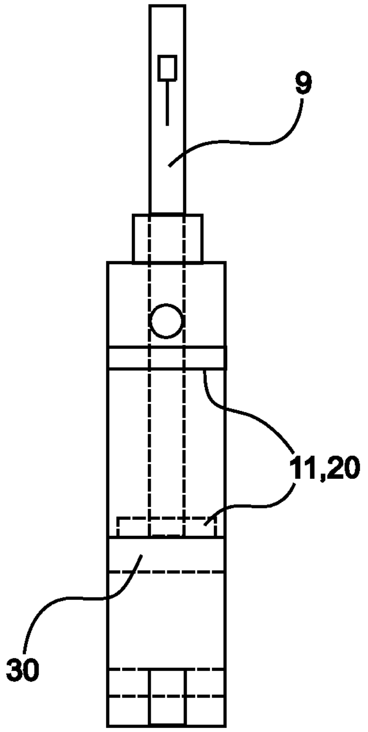
Figure 7B:
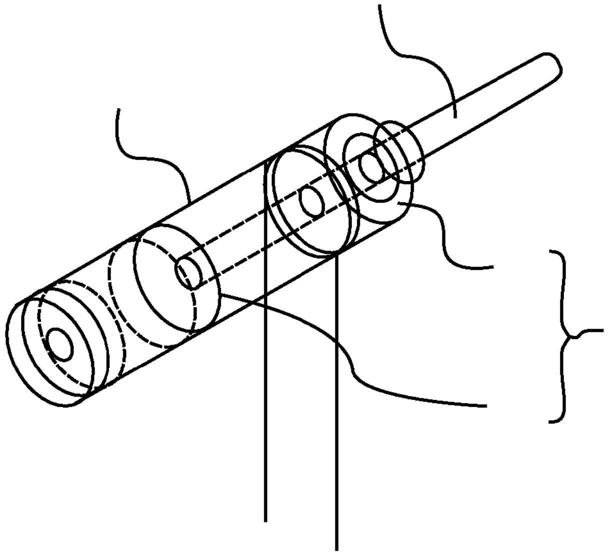
Figure 7C:
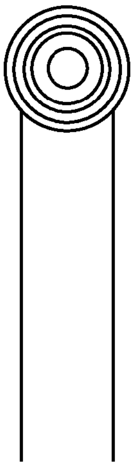
Figure 7D:
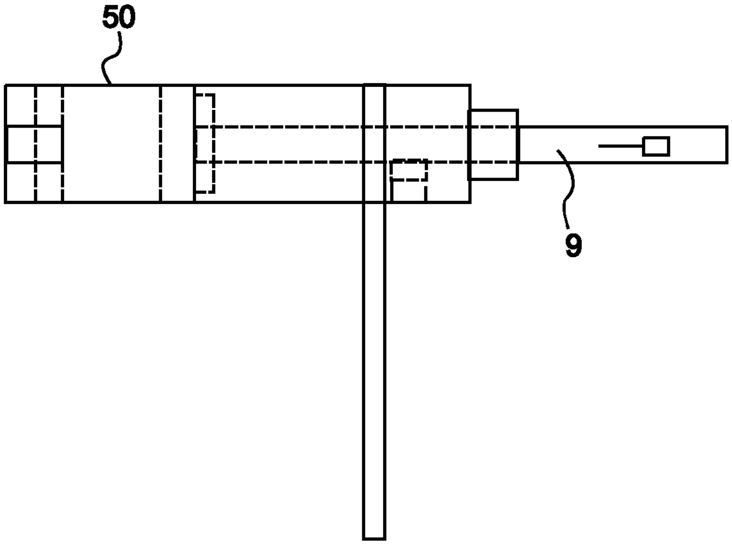

FIG. 7A shows a top view of components of an embodiment of the inventive position control apparatus with electromagnetic biasers; FIG. 7B shows a perspective view of components of an embodiment of the inventive position control apparatus with electromagnetic biasers; FIG. 7C shows a front view of components of an embodiment of the inventive position control apparatus with electromagnetic biasers; and FIG. 7D shows a side view of components of an embodiment of the inventive position control apparatus with electromagnetic biasers (FIGS. 7A, B and D show a transparent cylinder).

Figure 8A:
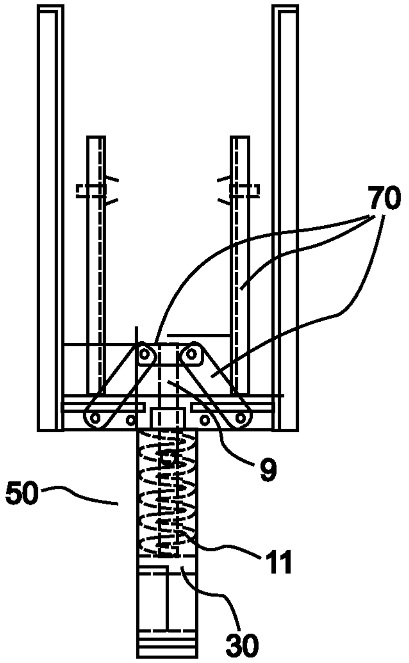
Figure 8B:
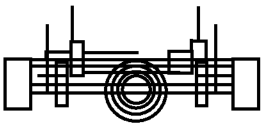
Figure 8C:
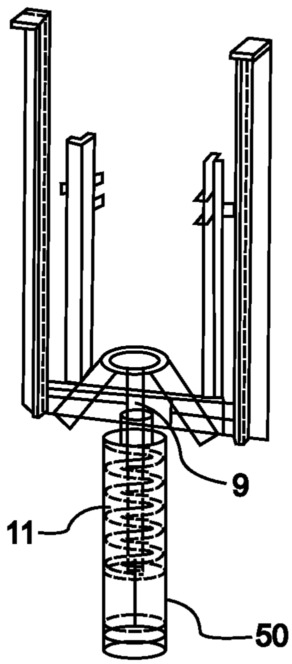
Figure 8D:
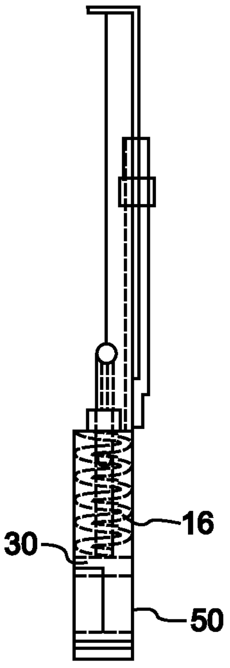

FIG. 8A shows a front view of linkage components of an embodiment of the inventive position control apparatus; FIG. 8B shows a top view of linkage components of an embodiment of the inventive position control apparatus; FIG. 8C shows a perspective view of linkage components of an embodiment of the inventive position control apparatus; FIG. 8D shows a side view of linkage components of an embodiment of the inventive position control apparatus (cylinder shown as transparent in FIGS. 8A, C and D).

Figure 9A:
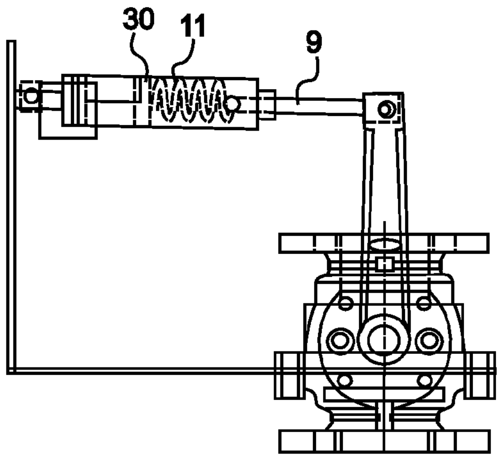
Figure 9B:
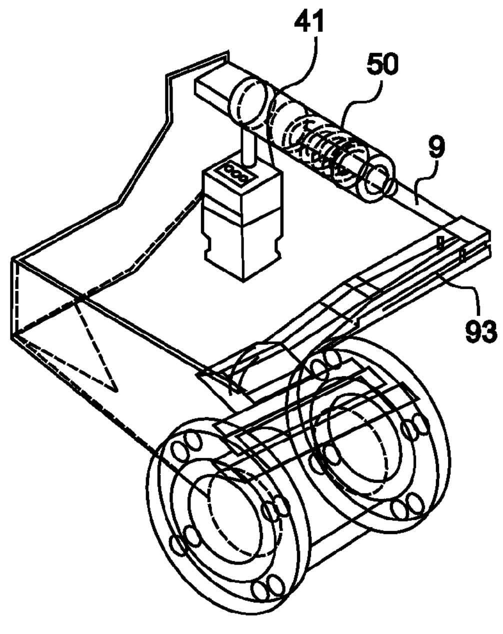
Figure 9C:
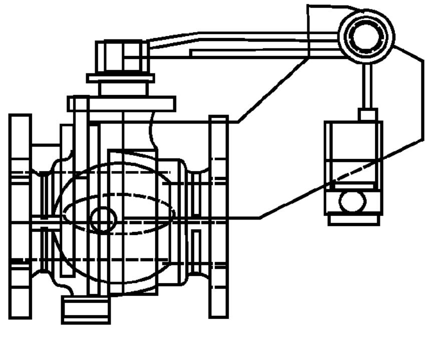
Figure 9D:
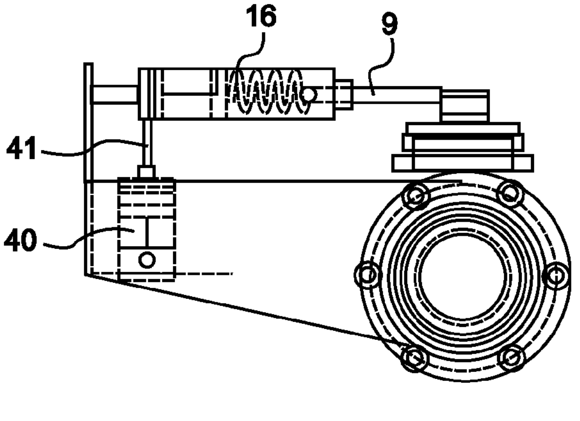

FIG. 9A shows a front view of components of an embodiment of the inventive position control apparatus as applied as a differential valve controller; FIG. 9B shows a perspective view of components of an embodiment of the inventive position control apparatus as applied as a differential valve controller; FIG. 9C shows a side view of components of an embodiment of the inventive position control apparatus as applied as a differential valve controller; FIG. 9D shows a top view of components of an embodiment of the inventive position control apparatus as applied as a differential valve controller (cylinder shown as transparent in FIGS. 9A, B and D).

Figure 10A:
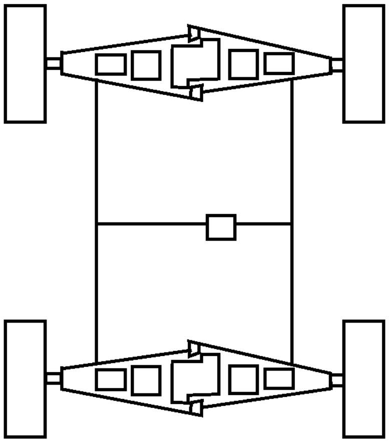
Figure 10B:
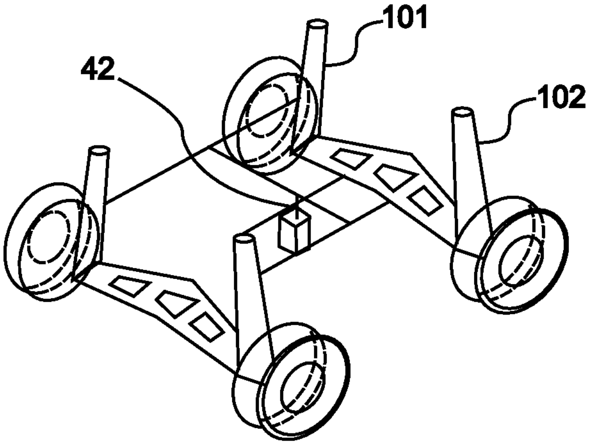
Figure 10C:
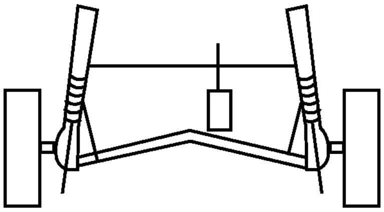
Figure 10D:
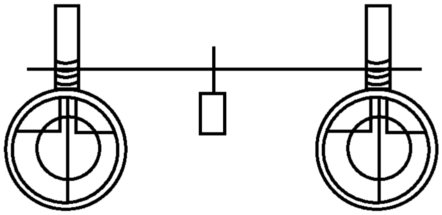

FIG. 10A shows a top view of components of an embodiment of the inventive position control apparatus applied as a vehicle suspension system; FIG. 10B shows a perspective view of components of an embodiment of the inventive position control apparatus applied as a vehicle suspension system; FIG. 10C shows a front view of components of an embodiment of the inventive position control apparatus applied as a vehicle suspension system; and FIG. 10D shows a side view of components of an embodiment of the inventive position control apparatus applied as a vehicle suspension system.

Figure 11:
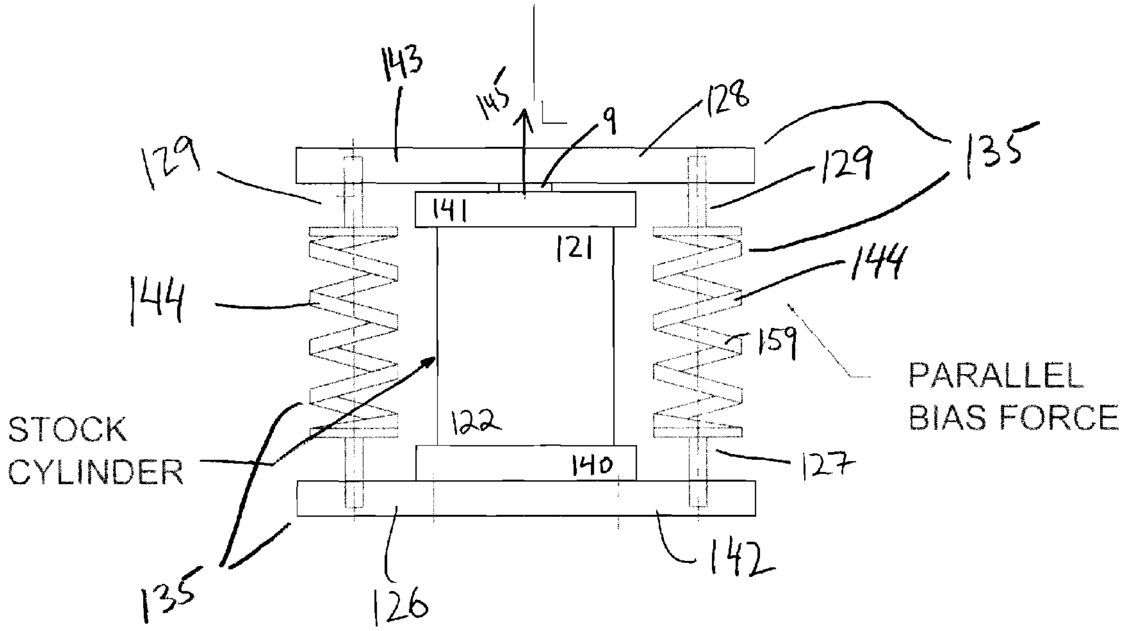

FIG. 11 shows an embodiment of the inventive technology where biasers are external of, and alongside, a cylinder that establishes a piston containing space. It shows an example of a retrofit apparatus in which a conventional two position cylinder was fit into an armature, thereby providing an infinitely adjustable positioner.

Figures 12A, 12B, 12C:
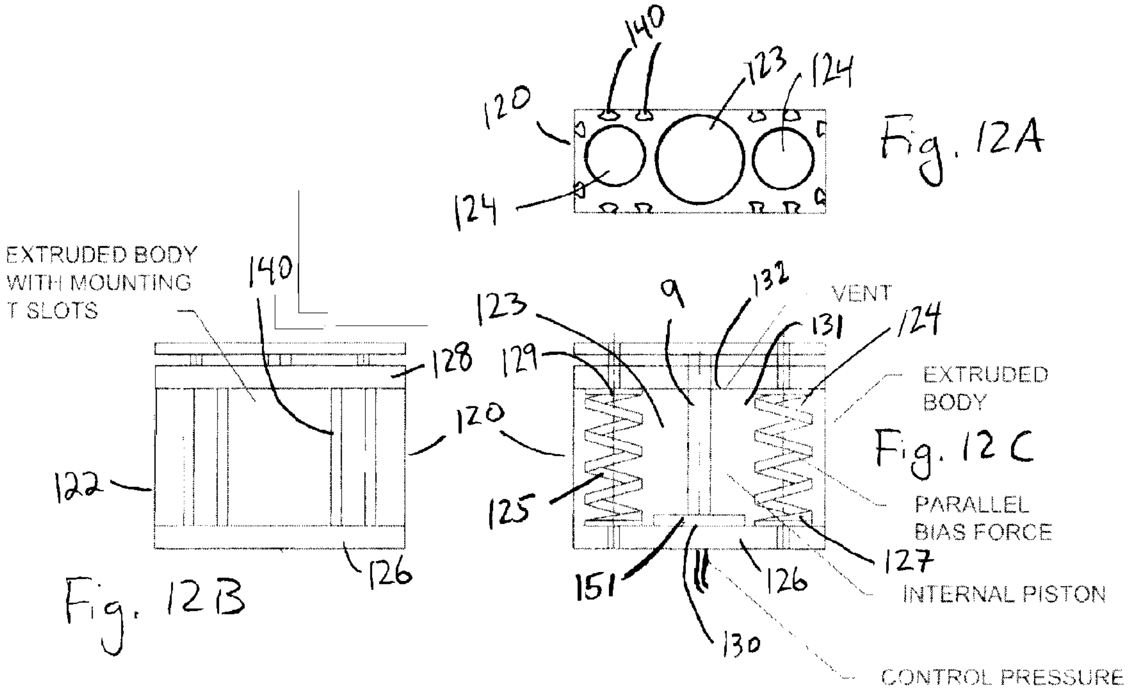

FIGS. 12A-C show and embodiment of the inventive technology where a block (perhaps an extrusion) establishes three spaces—one for the piston and two for two spring biasers. FIG. 12A shows a view of the block itself from the top; FIG. 12B shows a view of the block from the side (note the second (movable) support at the top thereof), and FIG. 12C shows a transparent view from the side (where the block itself, and the tube around the springs is transparent, revealing the otherwise concealed piston, positioner and springs). FIG. 12A shows a top view; FIG. 12B a side view; and FIG. 12C a side transparent view. It is of note that the block type embodiment may afford a positioner that is even more compact and efficient (and easier to mount) than the cylinder type embodiment.

Figure 13A:
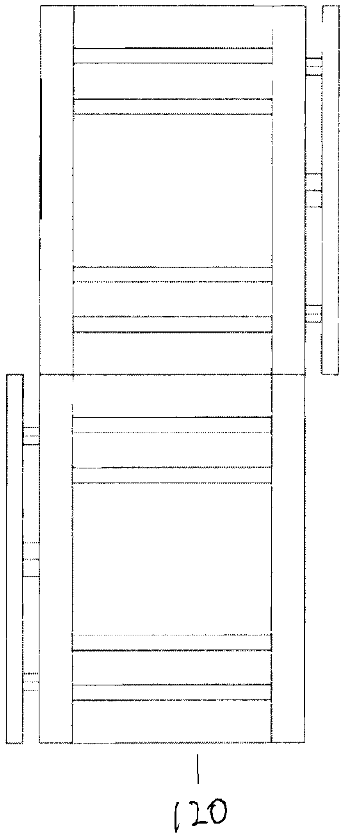
Figure 13B:
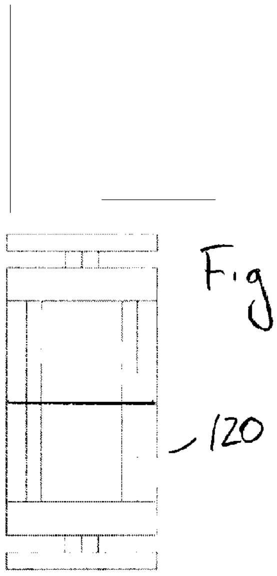
Figure 13C:
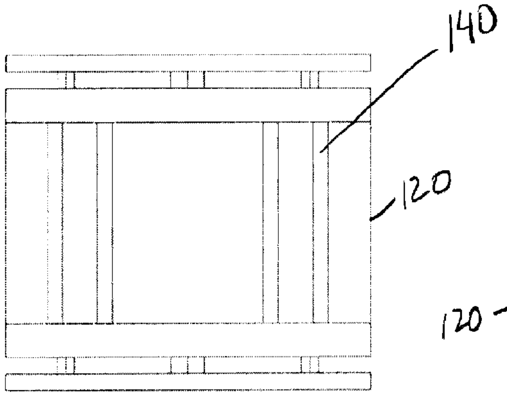
Figure 13D:
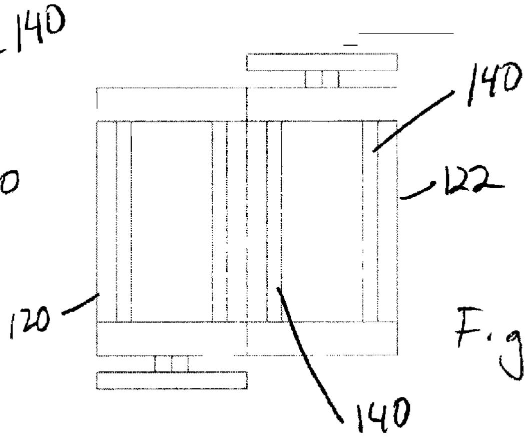

FIGS. 13A-13D shows block type embodiments attached side to side; FIG. 13B shows an end to end arrangement. Such configurations may afford even greater application and functionality, and increase positioning distance, or stroke length, (e.g., double distance), and increase overall system efficiency relative to "single" apparatus configurations.

Figures 14A, 14B, 14C, 14D, 14E, 14F:
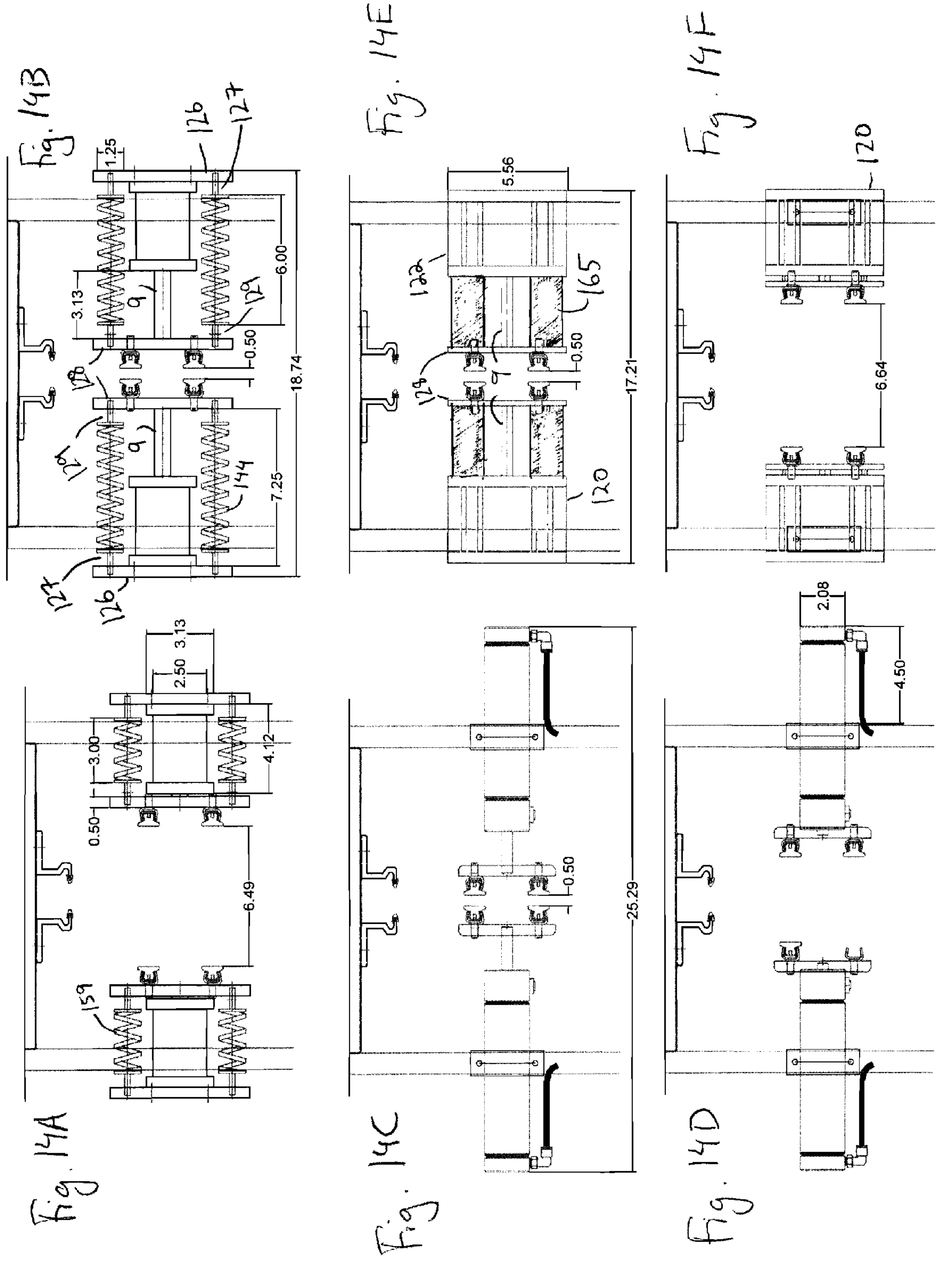

FIGS. 14A-F show embodiments of "spring external" (i.e., spring external of the piston containing space) extrusion type apparatus and "spring internal" cylinder type apparatus as applied to a bottle conveyance line, for comparison purposes. FIGS. 14A (full retraction) and 14B (full extension) show a "spring internal" cylinder type apparatus, while FIGS. 14C (full extension) and 14D (full retraction) show a "spring internal" (i.e., spring internal of the piston containing space) embodiment. FIGS. 14E and 14F show a body (specifically, an extrusion) type embodiment (as opposed to a cylinder type embodiment), in fully extended and fully retracted configuration, respectively. Of particular note is the increased efficiency of the spring external type apparatus (FIGS. 14A, 14B, 14E and 14F, and FIGS. 15B, 15C and 15D) as compared to the spring internal type apparatus (FIGS. 14C, 14D and 15A).

Figures 15A, 15B, 15C, 15D:
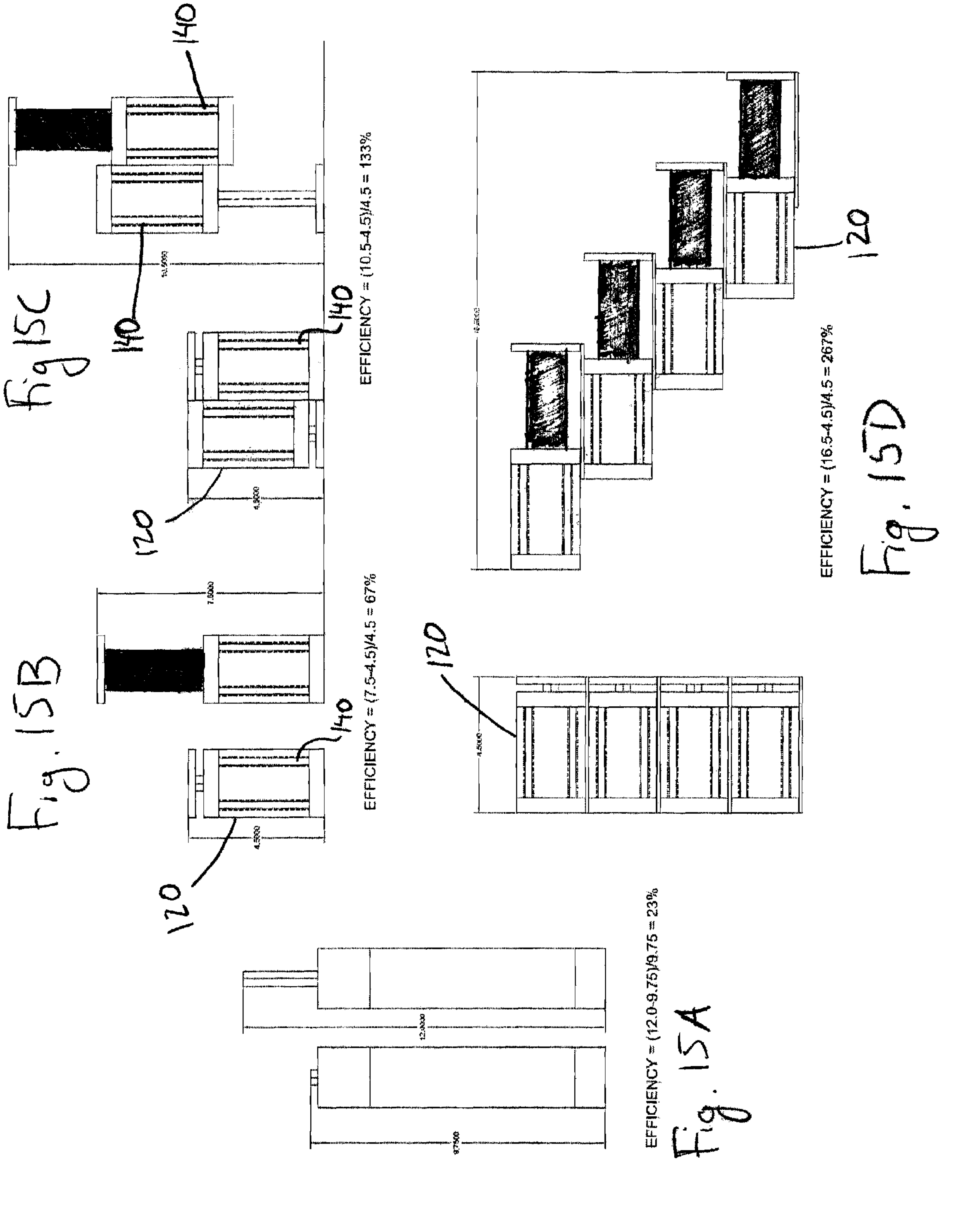

FIGS. 15 A-C show operational efficiencies of various inventive apparatus. FIG. 15A (left side shows fully retracted configuration; right side shows fully extended configuration) shows a single stage, non-stacked, non-telescoping, infinite position, "spring internal" embodiment with an efficiency of 23%. FIG. 15B (left side shows fully retracted configuration; right side shows fully extended configuration) shows a single stage, non-stacked, non-telescoping, infinite position, "spring external" embodiment with an efficiency of 67%. FIG. 15C shows a two stage arrangement (left side shows fully retracted configuration; right side shows fully extended configuration) with an efficiency of 133%. FIG. 15D shows a four stage arrangement with an efficiency of 267% (left side shows fully retracted configuration; right side shows fully extended configuration). Note that in FIGS. 15A, 15B and 15C, movement of one positioner 9 of a first block effects movement of a block that is connected therewith. Such side by side connection (of one block to the moving positioner of an adjacent block) can achieve tremendous efficiencies. When positioner control apparatus are connected side by side in such fashion instead of end to end, the inefficiency associated with the piston width is avoided.

Figure 16B:
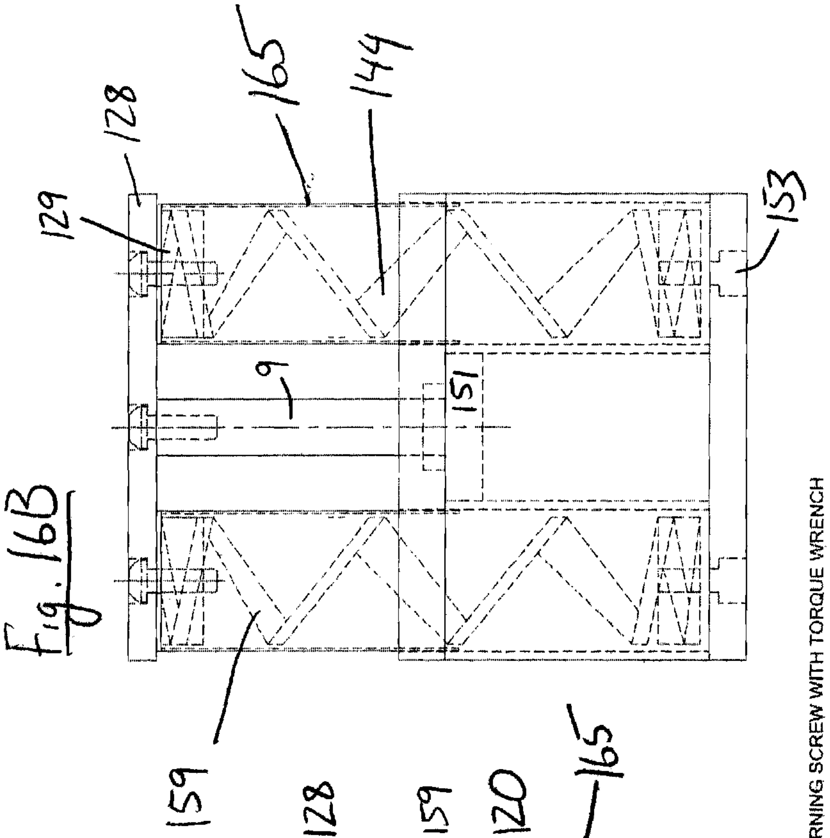
Figure 16A:
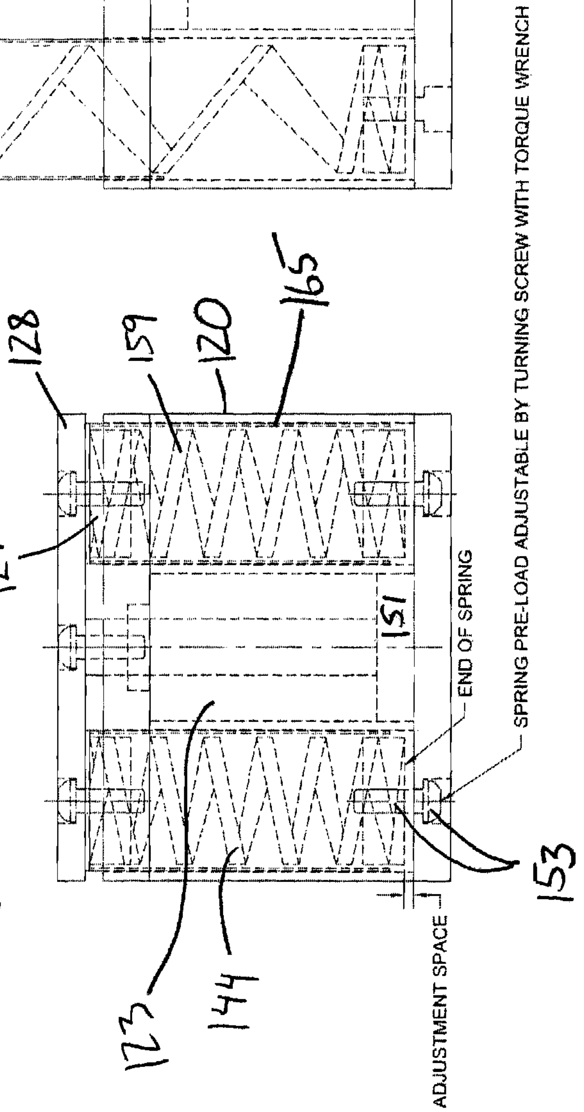

FIGS. 16A-B show an embodiment of the spring length adjuster technology as applied to an extrusion type apparatus. FIG. 16A shows the position control apparatus in full retraction mode while FIG. 16B shows the position control apparatus in full extension mode.

V. DETAILED DESCRIPTION OF THE PREFERRED EMBODIMENTS

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Particular embodiments of the inventive technology may be described as a position control apparatus 6 that comprises a fluidic drive system 7 (e.g., a system that uses pressurized fluid to drive one or more parts or items) configured (or set up) to drive, with a single fluidic displacement 8 (e.g., a slug of fluid released from a compressor upon even slight depressurization thereof), each of a plurality of positioners 9 in a first relative direction 10; and a bias system that includes a plurality of biasers 11 that bias the positioners in a direction 12 that is opposite the first relative direction. It is of note that every time a pressure of a single compressor is increased, regardless of how slightly, a single fluidic displacement takes place; a "zone" may be defined as including those positioners that are driven by the single fluidic displacement (e.g., from a single compressor). Along a single item (such as bottle) conveying line (as but one example), there may, of course, be more than one zone.

Figure 1:
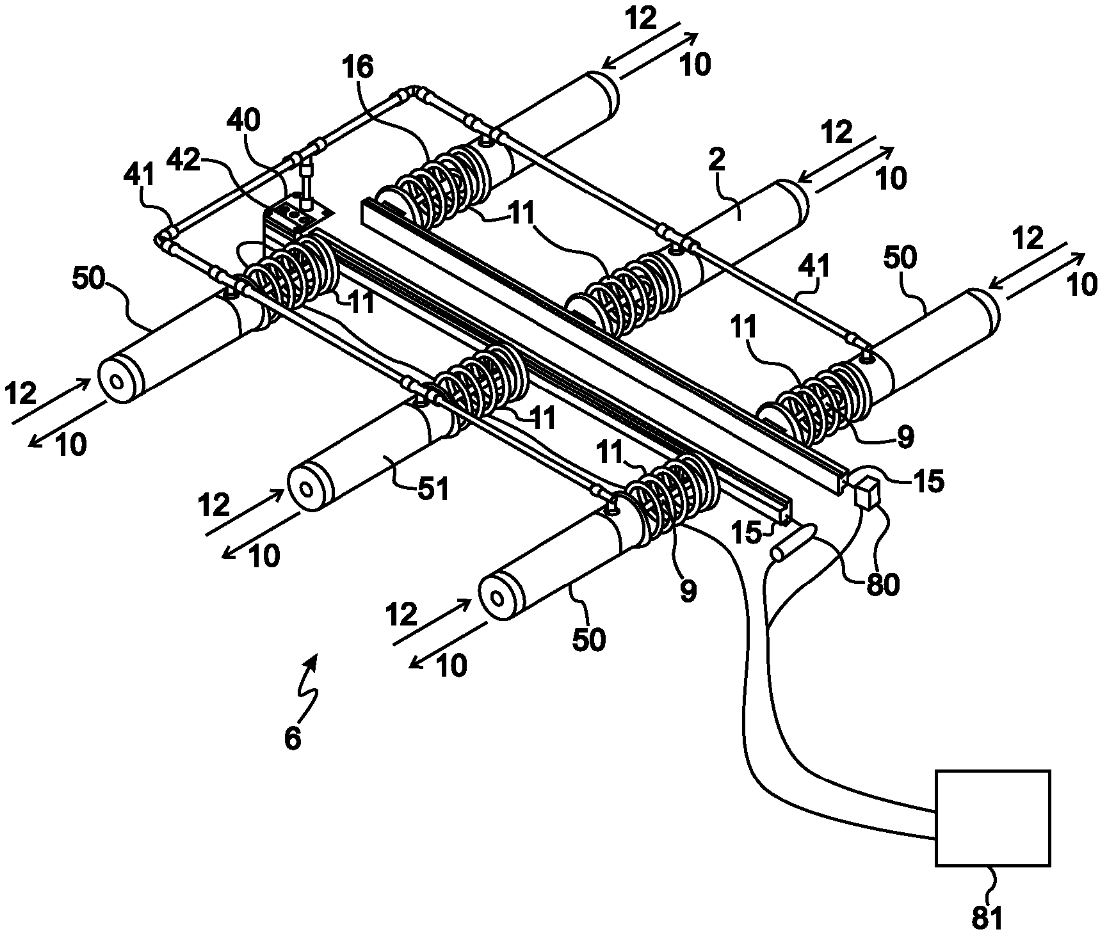
FIG. 1 shows a perspective view of an embodiment of the inventive position control apparatus (biasers are external helical springs).
Figure 4:
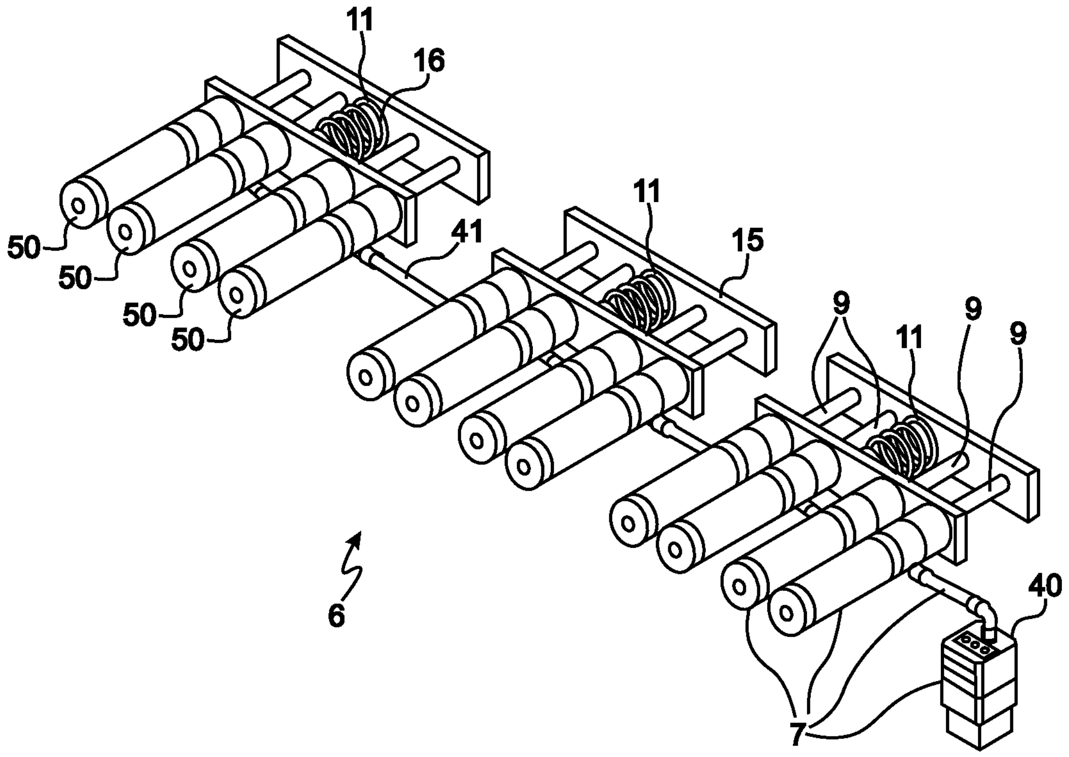
FIG. 4 shows a perspective view of an embodiment of the inventive position control apparatus (with helical springs as biasers), with pistons shown in solid line for clarity (part of positioner within cylinder not shown).
Figure 5:
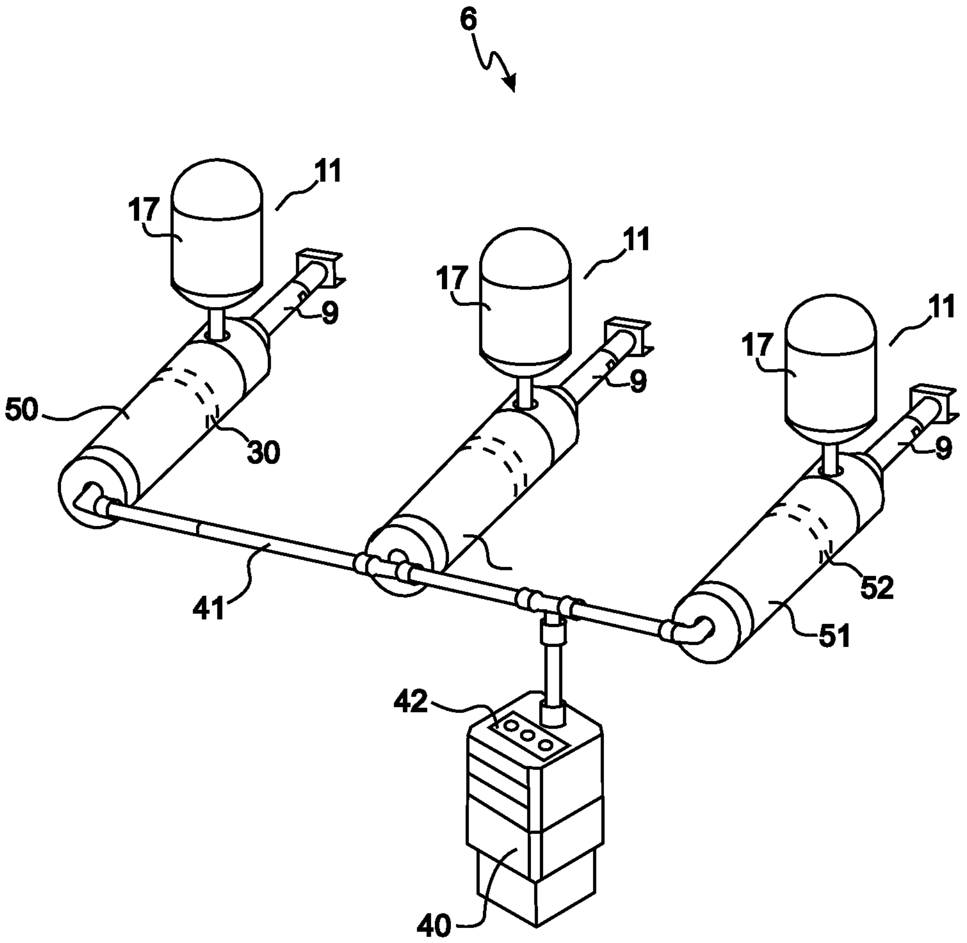
FIG. 5 shows an embodiment of the inventive position control apparatus, with contained compressible fluid as biasers (pistons shown in dashed line; part of positioner within cylinder not shown).
Figure 6:
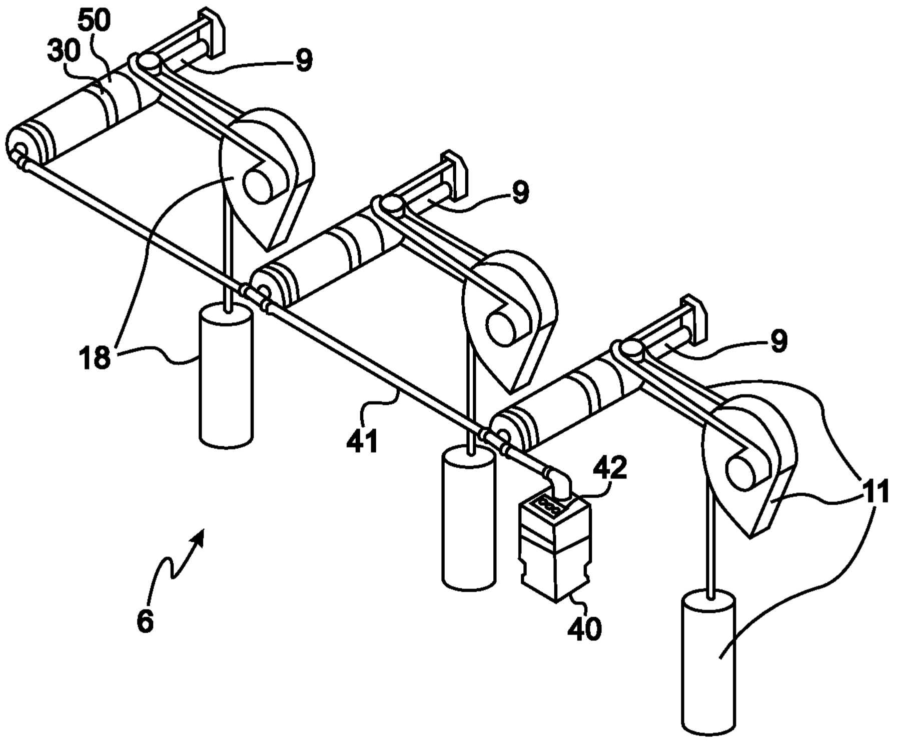
FIG. 6 shows a perspective view of a weighted cam biaser embodiment of the inventive position control apparatus, with pistons shown in solid line for clarity (part of positioner within cylinder not shown).

It is of note that the term "relative direction" is used because (a) often the application requires control of, e.g., side guides 15 that control position of an item (e.g., a bottle being conveyed) by moving in towards it (or away from it) from opposite sides of the bottle (such that, strictly speaking, such control movements are in opposite directions); and (b) particularly when the position control apparatus is a side guide control apparatus (e.g., to control the position of bottles during conveyance, as shown in FIG. 1), the conveyor might change direction (i.e., at first it might head west, then turn right and head north). Relative direction is considered a more accurate term than the unqualified term "direction" because "relative direction" is relative to, e.g., a component or item (e.g., a bottle) whose position is to be controlled. As such, a first relative direction may be in towards a bottle that is being conveyed (or, perhaps away from a bottle that is being conveyed); the opposite direction would be away from the bottle, and towards the bottle, respectively. Embodiments showing a first relative direction that is away from the bottle (i.e., the compressed air drives the positioners away from the bottle) include FIGS. 1 and 4; examples of embodiments showing a first relative direction that is towards the bottle (i.e., the compressed air drives the positioners towards the bottle) include FIGS. 2, 3, 5 and 6. Looking at FIG. 2, for example, as can be readily appreciated, when compressed air is released into any of the three cylinders, it would drive the piston away from the end of the cylinder where the compressed air enters, against the controlling and stabilizing force of the compressed spring; when air is released from the cylinder, the spring would act to drive the piston towards the end of the cylinder where the compressed air enters, against the controlling and stabilizing force of the air still contained in the cylinder.

It is of note that there are a variety of alternate configurations of the inventive technology. For example, a position control apparatus could have a biaser established internally (e.g., FIG. 2) or externally (e.g., FIG. 1) of a cylinder; the compressed air could enter on the positioner side of a piston (e.g., FIG. 1) or on the other side of a piston (e.g., FIG. 2); and the biaser could be established on the positioner side of a piston (e.g., FIG. 3) or on the other side (whether that biaser be established externally or internally). These "options" amount to eight basic configurations for embodiments having pistons. FIG. 1 shows a configuration where external biasers are established on the positioner side of a piston and compressed air enters on the positioner side of the piston. Configuring biasers in each of these configurations would be well known to anyone of ordinary skill in the art; in FIGS. 1-6, it may merely involve selecting and establishing a spring such that it will be compressed along all expected ranges of motion of the positioner. In other of the eight configurations, it may involve selecting and establishing a spring such that it will be stretched along all expected ranges of motion of the positioner. Additionally, extreme positioner positions should not invoke either a unacceptably weak or unnecessarily strong bias force.

The biasers 11 may be any of a plurality of various types, including but not limited to: springs 16; contained compressible fluid (e.g., gas) 17; weighted cams 18; elastic materials 19 (e.g., rubber "stopper" shapes); fluid filled elastic containers; electromagnetic devices 20 (e.g., as where magnets, an electro-opposing magnet 111 and a permanent magnet 112 are used in opposition to one another); and/or electromechanical devices, as but a few examples. Indeed, any device or system that can provide an elastic bias force may be used. Of course, the elasticity of the biaser may be what enables, at least in part, the repeated re-positioning of positioners 9. Plastic deformation of biasers, if more than de minimus, is undesired. Additionally, preferred embodiments may include biasers that provide a biasing force that is proportional to the displacement of the positioner (which may be the same as the displacement of the biaser). Such relationship may be linear (e.g., as provided by a linear spring or certain contained, control volume gases), but need not be. As one might expect, the biasers may, in addition to possibly providing other functions, provide predictable stability to the system in opposing the drive force, and thereby allow accurate, controlled positioning of the positioners as desired. In certain embodiments, a biaser(s) may act directly against the driving force provided by the compressed fluid acting on a piston 30. It is of note that designs described as including each of a plurality of biasers configured to bias at least one of the positioners include designs where one or more biasers biases a positioner (which, in certain embodiments, may be responsive to (e.g., moved by) one or more than one piston 30). In particular embodiments, each of the biasers may be independently movable relative to all other biasers (such that one biaser can be moved without effecting movement of another). Such feature alone may provide an unforeseen degree of operational control and simplicity.

The fluidic drive system may be a pneumatic drive system or a hydraulic drive system, as but two examples; either system may include a fluid compressor 40 and a fluid conveyance system 41 (e.g., tubes made from sufficiently strong and rigid material) that conveys pressurized fluid from the fluid compressor to the positioner actuators 50). A pressure regulator 42 (including but not limited to digital pressure regulators) is often found for use in conjunction with (or as part of) fluid compressors. Preferably, the fluidic drive system comprises a plurality of positioner actuators 50 (such actuate the movement of the positioners 9, whether in first relative direction or a direction opposite that first relative direction); each of the positioner actuators may, in particular embodiments comprise a cylinder 51 having a piston 30 therein (as but one possible type of positioner actuator). Often, such piston-type cylinders are single acting (e.g., with a cavity for accepting fluid on one side of the piston and a biaser (e.g., a spring) and an air vent 53 on the other). Of course, if the system can be configured in either way such that the first relative direction is towards the conveyed bottles (in an exemplary application) or, in an opposite configuration, such that the first relative direction is away from the conveyed bottles.

Figure 2:
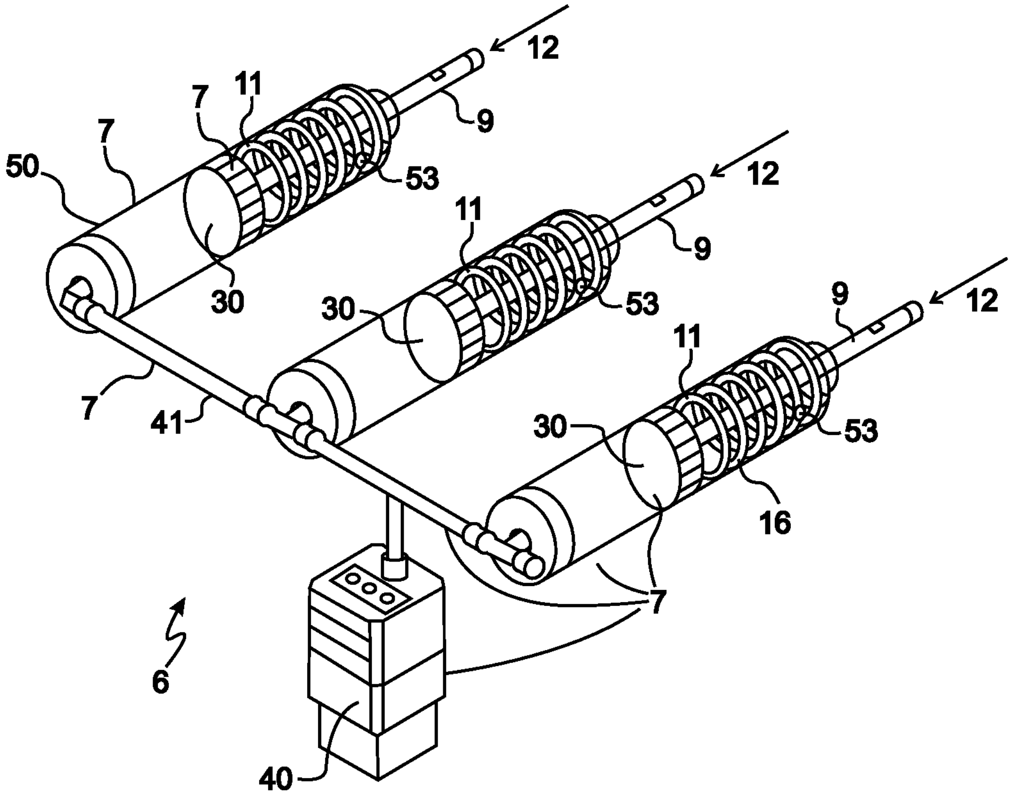
FIG. 2 shows a perspective view of an embodiment of the inventive position control apparatus (biasers are internal helical springs), where the cylinders are transparent to show internal components.
Figure 3:
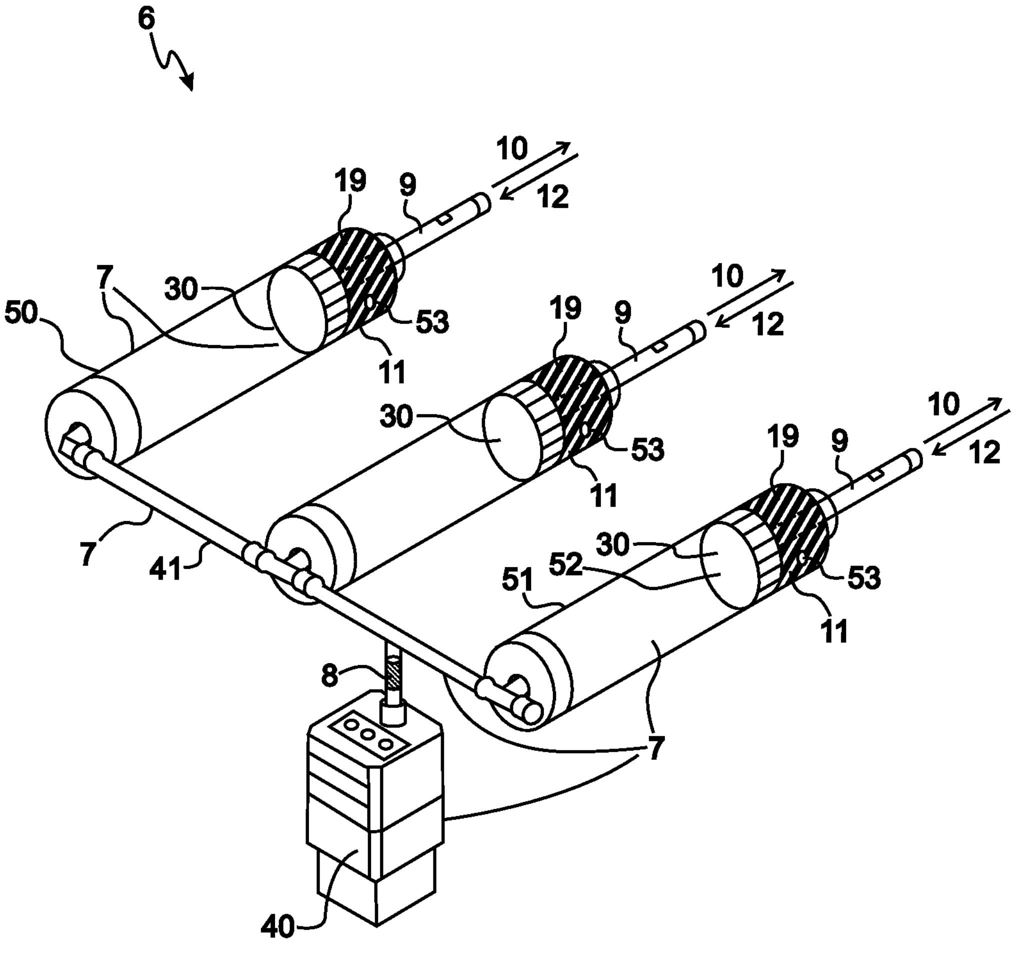
FIG. 3 shows a perspective view of an embodiment of the inventive position control apparatus (with an elastic material serving as biasers), where the cylinders are transparent to show internal components.

Generally, a positioner actuator 50 controls, at least in part, the position of the part whose position is to be ultimately controlled (e.g., a side guide 15); the control it provides may be more "direct" than any control that might be the to be provided by the compressor or a regulator attached thereto. In preferred embodiments, the positioner actuators 50 are linked in parallel with a fluid compressor. One advantage of fluidicly linking positioner actuators in parallel (as shown in FIGS. 1 and 2, as but two examples) is that if one actuator gets "stuck" in a certain position, or if tubing to one becomes blocked, the others still can operate properly. Further, for certain applications (e.g., conveyed bottle side guide position controllers, as shown in FIG. 1), entirely acceptable results may be observed using positioner actuators having a +/−0.05 inch accuracy. Such relatively inexpensive actuators may further the benefits of the inventive system, particularly in those systems where many actuators are used (some may use hundreds of actuators).

Biasers 11, generally viewed as distinct from the fluidic drive system 7, may be established within or externally of the positioner actuators 50; as such, in certain embodiments, springs 16, a type of biaser 11, may be inside or external of positioner actuators 50. Further, one biaser 11 may be dedicated to a single one of the positioner actuators (see, e.g. FIG. 1), more than one biaser may be dedicated to a single one of the positioner actuators, or one biaser may be dedicated to two or more positioner actuators (see, e.g. FIG. 4). In certain embodiments, each of the biasers may bias a single one of the positioners; in other embodiments, there may be more than one positioner for each biaser, or more than one biaser for each positioner. Biasers, particularly where the force they exert is easily countered by a human hand (as is the case in a typical positioner extension), may provide the ancillary benefit of allowing for easy hand manipulation of a positioner (or a side guide attached thereto) in order to, e.g., remove a jammed bottle, and the benefit of preventing jams in the first place by providing an elastically resilient positioner (an thus, in side guide embodiments, an elastically resilient side guide).

In certain piston-type actuator apparatus, the positioners are immobile relative to a single one of the pistons (in such embodiments, the positioners may be similar to "connecting rods" or "piston rods", as shown in FIG. 2). Even where the positioners are hingedly attached to a piston (so there is some relative rotational movement), if they are immobile relative to one another along an axis that is in line or parallel with the first relative direction, then they are considered immobile relative to one another. Further, in certain embodiments, each of the positioners is capable of travel within only one spatial range during an apparatus setup.

It is of note that it is not always the case that the positioners 9 are the part whose position is, ultimately, the position of actual concern particularly in the case where the apparatus includes side guides 15 or is used to position side guides 15. In certain embodiments, there may, e.g., be a linkage 70 between the positioner 9 and the part whose position is, ultimately, the position of actual concern (e.g., a side guide). As such, the apparatus may further comprise a linkage 70 (e.g., a scissor-type linkage) connecting the positioner with the part (e.g., a side guide 15) whose position is ultimately the position of actual concern 15.

Distance sensors 80 may be used to provide accurate positioning, particularly in those applications where, for one reason or another, positioners or side guides may drift or be moved out of proper position during apparatus operation (e.g., during a single "run" on a certain bottle size). Distance sensors may also be helpful in accurately re-positioning positioners or side guides between different applications, perhaps as necessitated by the different sized item to be conveyed during a new "run" (e.g., to process a different bottle size). As such, particular embodiments may further comprise at least one distance sensor established to measure a distance (between two oppositely facing side guides, or between a side guide and a bottle, as but two examples) that can be adjusted by the position control apparatus. The at least one distance sensor may comprise a plurality of distance sensors, where possibly each distance sensor is dedicated to one, or, in a different embodiment, more than one positioner. Types of distance sensors include but are not limited to optical distance sensors and linear transducers.

A programmable logic controller (PLC) 81 may be used, particularly in those embodiments featuring distance sensors. The PLC may be configured to adjust the fluidic drive system to adjust (the position of) at least one of the positioners; such adjustment may be necessary during a new "run" (e.g., a new run of a bottle conveyor, to process a bottle size having a width that is different from that width of the immediately prior "run"). In certain embodiments (see, e.g., FIG. 1), one distance sensor is used for all positioners that are linked to a single compressor, and the PLC will be used to substantially equally and simultaneously adjust all such positioners. If more than one distance sensor is used for all positioners that are linked to a single compressor, then either: (a) measurements from such sensors may be manipulated (e.g., averaged) to generate an average measurement that can then be used to substantially equally and simultaneously adjust all such positioners; or (b) there may be provided a control system where a certain portion of the positioners (perhaps only one, where there is a one distance sensor to positioner ratio) will be adjusted according to feedback from a single distance sensor. In either design, there may need to be provided a PLC and a pressure regulator for each distance sensor. In preferred embodiments having a PLC and distance sensors, the PLC is configured to repetitively adjust the fluidic drive system in response to distance measurements repetitively made with distance sensor(s).

Particular embodiments of the inventive position control apparatus technology may be described as comprising a fluidic drive system 7 that comprises a fluid compressor 40 and a plurality of positioner actuators 50 fluidicly linked in parallel and with the fluid compressor 40; a piston 30 in each of the positioner actuators 50; and a plurality of positioners 9, each of which is responsive to (e.g., movable by) at least one of the pistons 30, wherein the drive system 7 is configured to drive the piston 30 in a first relative direction 10, and wherein the apparatus further comprises a plurality of biasers 11, each of which is configured to bias at least one of the positioners 9 in a direction 12 opposite the first relative direction. In certain of such embodiments, each of the positioners 9 is responsive to one of the pistons 30. It is of note that the general description provided in this paragraph may be further characterized by any of the above-presented descriptions of alternative designs and design specifics.

As mentioned, applications of position control apparatus include, but are not limited to, the following: side guide position control apparatus (see, e.g., FIG. 1), a differential valve controller (see, e.g. FIG. 9), and a programmable vehicle suspension system (see, e.g. FIG. 10). The inventive technology may find application wherever linear actuators may find use and, indeed, in other areas also. Of course, the inventive technology, in particular embodiments, may find particular application in those systems benefiting from repeated adjustment as necessary to assure proper positioning and/or, in systems that are usable to process differently sized items (e.g., bottles of different sizes), where components need to have their position adjusted before a specific "run", depending on the size of an item processed during that "run." It is of note that, particularly when finding application as part of a programmable vehicle suspension system (e.g., to control ground clearance), the apparatus may include a throttling valve through which the compressed fluid, initially entering at 101, could be passed to provide dampening via damper 102. In the differential valve controller apparatus, a PLC may use either valve position or flow information feedback to adjust the position of the valve to achieve the intended flow rate. The differential valve controller apparatus may include, inter alia, a compressor 40 (and typically also a pressure regulator), a positioner actuator 50 (e.g., a biased cylinder) and a valve arm 93. Of course, a PLC may be used in conjunction with the pressure regulator, perhaps relying on feedback from a distance sensor (which might measure the position of the valve arm) or a flow meter, as but two examples.

It is of note that in certain embodiments, it is advantageous to provide a single zone with springs having substantially identical spring constants. Such results in a zone having positioners that extend or retract in similar manner and that result in, e.g., the positioning of a side guide as desired with sufficient precision. Precision springs may provide a satisfactory operational precision, but such springs may be cost prohibitive. In order to avoid such high costs, position actuators may be outfitted with less expensive springs, tested, and grouped according to their response (e.g., displacement) under a given driving force. Each zone may be outfitted with only actuators of a single group, thereby providing the needed precision. Of course, the closer the responsive behavior of the springs in a single group, the more precise the positioning of the positioners.

Another manner in which to reduce costs may involve the use of a control system that, instead of including one regulator for each zone, uses a single regulator (e.g., a proportional regulator, such as a digital proportional regulator), for more than one air tank. The system typically would include auto valves for switching between the air tanks and be housed as a single control unit. Such system might be particularly applicable for applications wherein continual, repeated monitoring of every single zone at the same time is not needed, but rather where it is sufficient that the system allows for sequential, zone-by-zone repositioning, whether between "runs" on different sized container (for example), or to maintain proper positioning during a single run.

Particular embodiments may include device that serve to lock the positioner in a certain position. Such a device may become engaged once the positioner reaches a certain position, or once fluidic pressure is changed (e.g., released or increased). The device may be of many types, including a clamp, and may be built into or onto a positioner actuator or a component thereof (e.g., a cylinder). An exemplary type of position lock device is a donut shaped, hard rubber bellows that fits around a positioner (e.g., a piston rod), that may nestle in a specially configured slot in the nose of the cylinder. When fluid pressure changes, the bellows may expand (or indeed, even contract), thereby locking the positioner in place. Of course, there are many types of lock systems, including indexing systems (as but one example), that may serve to secure the positioner (and, e.g., a side guide attached thereto) in a desired position. As can be readily appreciated, such locking systems would be especially advantageous in high tolerance applications where even a small loss of proper position (e.g., because of a slight decrease in air pressure) would be unacceptable.

The inventive technology includes position control methods, one of which may generally be described as comprising the steps of: driving, with a single fluidic displacement 8, each of a plurality of positioners 9 in a first relative direction 10; and biasing, with a plurality of biasers 11, the positioners 9 in a direction 12 that is opposite the first relative direction, wherein the step of driving is accomplished, at least in part, with a fluidic drive system 7. An inventive position control method may also be described as comprising the steps of: fluidicly linking a plurality of positioner actuators 50 in parallel and with a fluid compressor 40 to establish a fluidic drive system 7; establishing a piston 30 in each of the positioner actuators 50; establishing a plurality of positioners 9 so that each of the positioners is responsive to at least one of the pistons 30; configuring the fluidic drive system 7 to drive, with a single fluidic displacement 8, each of the pistons 30 in a first relative direction 10; and configuring each of a plurality of biasers 11 to bias at least one of the positioners 9 in a direction 12 opposite the first relative direction. It is of note that the general description provided in this paragraph may be further characterized by any of the above-presented apparatus descriptions of alternative designs and design specifics, but applied here as they may more particularly relate to a method.

At least one embodiment of the inventive technology may be described as a position control apparatus that comprises: a fluidic drive system configured to drive at least one positioner 9 in a first relative direction, the fluidic drive system comprising at least one positioner actuator that each includes a piston containing space The apparatus may further comprise a housing 122 that defines the piston containing space, the piston containing space defined by a pressurized fluid side housing end 130, a positioner side housing end 131, and housing walls 132 therebetween. Further, the apparatus may include: a bias system that itself includes at least one biaser 125 established externally of the piston containing space, the bias system biasing the positioners in a direction that is opposite the first relative direction via tension; a first support 126 with which a first biaser end 127 of each of the at least one biaser is connected; and a second support 128 to which a second biaser end 129 of each of the at least one biaser is attached, the second support moving with the positioner during apparatus operation. The housing may be a block 120 (see FIGS. 12A, 12B, 12C, 13,14C, 14D, 15B-F and 16) or by a cylinder 121 (see FIG. 11) in which a piston 151 is established and from which one of the at least one positioner extends, where one of the at least one positioner is connected with the piston (typically directly, but also indirectly). "Block" is a general term for a rigid material contiguity that establishes the piston containing space 123 and perhaps other spaces 124 (whether cylindrical or not) in which biaser(s) (external of the cylindrical space housing the piston) may be established. Such block may be, in one example, an extrusion (see, e.g., FIGS. 12A and 12B). It need not be square, rectangular, or "blockish" in shape, but merely needs to house a piston containing space (or bore) and at least one biaser. Further, when the apparatus is in a full retraction configuration, at least part of the housing and at least part of the positioner is established between the first support and the second support. The apparatus, as intended, enables adjustment of the at least positioner to a plurality of positions (perhaps an infinite number of positions) within a positioner range.

In certain embodiments, the first support is fixed during the apparatus operation while the second support is connected with the positioner (and thus moves with the positioner). Note that the term fixed means fixed (and immovable) relative to the housing of the piston containing space (whether that housing be a block or a cylinder). As such, even where the housing of a first position control apparatus is attached (whether directly or indirectly) to a positioner of a second, adjacent apparatus (see FIG. 13, FIGS. 15C and 15D), the first support is said to be fixed. This definition applies to other uses of the term "fixed" (e.g. a fixed armature end); similarly, the term movable (e.g., a movable support or movable armature end) implies movable relative to the housing defining the piston containing space. The pressurized fluid side housing end may be part of the first support, or the first support may be part of the pressurized fluid side housing end. The housing may be connected with the first support and the at least one biaser may be established alongside the piston containing space (indeed, the biaser(s) may surround the piston containing space). The first support may play an important role in providing a base for the bias force, and thus, provide an important role in transferring the bias force to the piston. Often, particularly in high operational efficiency designs, the at least one biaser may be established externally of the piston containing space. Further, particularly in embodiments where the housing is a cylinder 121 (as opposed to a block 120), the first support, the second support, and the at least one biaser may form an armature 135 into which the cylinder can be retrofit. Note that a cylinder is viewed as being retrofit into an armature even where the armature is fit around the cylinder.

Particularly in those embodiments where the housing is a block, the at least one biaser may be established within the housing. Further, the first support may be part of the housing. In particular embodiments, as shown in FIG. 12, the housing may establish at least three cylindrical spaces (see FIG. 12A), one of which 123 houses one of the pistons, and the remaining of which 124 each houses a different one of the at least two biasers. In certain embodiments, the first support may be part of the housing. As mentioned, the apparatus may include a second support; second biaser end(s) 129 of the at least one biaser may be connected therewith such that the second support moves with the positioner during apparatus operation. As such, the second support may play a critical role in applying the bias force to the piston (thus enabling precise control via driving pressure regulation of the positioner's position). The supports may form ends of the apparatus (regardless of whether the apparatus is a cylinder type (with springs exposed, such as armature type) or block type (with springs concealed, at least when the apparatus is in full retraction configuration). As with any other design, the block may include mounting slots 140 that facilitate attachment of the apparatus to certain components of the device/apparatus in which the position control apparatus will be incorporated (e.g., component of a solar array, or of a conveyance system). Note also that, as shown in FIGS. 14E and 16B, when a block type position control apparatus is in a full extension position, a tube (e.g., a steel tube) may contain the spring (and slide out from the block during extension of the positioner). FIGS. 12C, 16A and 16B provide a transparent view showing the concealed spring (concealed by the block and the tube in full retraction configuration, and by the tube in full extension configuration). Note that surrounding the spring with a tube that moves with the positioner (and slides out of the block) is, like many of the disclosed features, not required.

Of course, positioner actuators may have a cylindrical space having a piston therein; such space may be established by a cylinder (as in the retrofit example as shown in FIG. 11), or a block. Particularly in embodiments where the biasers are external of any positioner actuator (which may include, inter alia, a piston, perhaps a piston rod, and the walls that form the space in which the piston moves) and where the piston containing space is formed by a cylinder (as opposed to a block), the biasers, in addition to two supports (perhaps a fixed (or first) support and a movable (or second) support, which may be in the form of metal bars (as but one example)) may form an armature 135. In particular embodiments (including retrofit embodiments), conventional actuators (e.g., two position cylinders) may be established in the armature such that the biasers (e.g., springs) provide a biasing force that opposes motion in the driving direction (e.g., springs may be in tension).

As mentioned, particularly where the biasers are springs and are established externally of the positioner actuator, such springs may be in tension. One or more biasers may be established around the piston containing space and thereby be associated with such piston containing space (typically a cylindrical space). It is of note that, as mentioned, where the space containing the piston is formed by a block (e.g., an extrusion), the biasers may be established around that space. While one biaser (e.g., a spring) may be established around the actuator, typically more than one biaser would be established therearound. Particular figures (FIG. 11, 12, e.g.) show two biasers established around the actuator. Whether one, two or more than one biasers is established around an actuator, such biasers may be connected with a positioner associated with that actuator. Such connection may be achieved via connecting the moving end of the biasers (the second end) to a second (or movable) support (e.g., a rigid member such as a bar, a plate, an annular ring, as but a few examples), and then perhaps connecting that support to the positioner in some fashion. Note that because it is only necessary that the second support moves with the positioner during apparatus operation, connecting the two (whether directly or indirectly) may not be necessary in some applications (because the bias force may keep the second (or movable) support established against the positioner).

In particular embodiments, a position control method may be described as comprising the steps of: establishing a cylinder 121 within an armature 135, the cylinder having a first cylinder end 140 that receives pressurized fluid and a second cylinder end 141 from which a positioner 9 extends in a first relative direction 145, wherein the armature has a fixed armature end 142 and a movable armature end 143 that oppose each other, and wherein at least one biaser 144 (at least one spring 159) is established within and as part of the armature. When the cylinder is established between the two opposing armature ends, at least one biaser may bias the two opposing armature ends towards each other (although only one end is typically movable) in a direction opposite the first relative direction, with a bias force. The method may further comprise the steps of connecting the fixed armature end with the first cylinder end; and establishing the movable armature end relative to the second cylinder end so that the movable armature end and the second cylinder end extend and retract together (perhaps via connecting them). This method may be described as a positioning system upgrading method (because, e.g., it may provide to a two position per cylinder system an ability to infinitely position); where the armature is retrofit onto a conventional cylinder (e.g., a two position cylinder) or vice versa, the method may be described as a retrofit method. It may also enhance operational efficiency of an existing cylinder or positioning system. The step of establishing a cylinder within an armature may comprise the step of establishing a cylinder within an armature such that the at least one/two/more than two biaser(s) is external of, parallel with, and alongside the cylinder (see, e.g., FIG. 11).

It is also of note that the inventive technology may include the step of identifying at least one positioner apparatus for replacement, where the positioner apparatus to be replaced enables positioning of a positioner into only two, three or four positions (e.g., full retraction, full extension, and possibly intermediate positions). This finite position cylinder may be simply removed, and replaced, with either a block type, or armature type inventive apparatus, as described and shown elsewhere herein. Such would enhance the positioning ability in that the installed apparatus may now provide infinite positioning, and/or may operate at a higher operational efficiency.

Particular embodiments of the inventive technology, generally characterized as a high operational efficiency position control apparatus, may be described as a position control apparatus that is reconfigurable between a full retraction mode and a full extension mode, and that perhaps effects positioning to any of an infinite number of positions as desired, the apparatus comprising: a positioner; a fluidic drive system configured to drive the positioner in a first relative direction; a piston containing space in which a piston is movable and from which the positioner extends in the first relative direction; and at least one biaser that biases the positioner in a direction that is opposite the first relative direction. Further, when the apparatus is in the full retraction mode, the apparatus may be the to have a full retraction length and when the apparatus is in the full extension mode, the apparatus has a full extension length, and an operational efficiency may be defined as the difference between the full extension length and the full retraction length, divided by the full retraction length. In particular embodiment, such operational efficiency may be at least 50%. In particular embodiments, it may be at least 60%, at least 65%, at least 70%, at least 80%, or at least 90%. Relative to conventional operational efficiencies of single stroke, non-stacked, non-telescoping, infinite position cylinders, and to single stroke, non-stacked, non-telescoping, biased positioning cylinders, the operational efficiency in particular embodiments of the inventive technology may be at least twice as great.

FIGS. 14 and 15 show relative extension lengths that may be used to determine operational efficiencies. Note from FIG. 15 that additional increases in efficiency may be achieved by connecting adjacent apparatus (e.g., by connecting block of on apparatus to a positioner of an adjacent apparatus). Such enhanced efficiencies include, but are not limited to: greater than greater than 100%, greater than 130%, greater than 150%, greater than 200%, greater than 250%, and greater than 260%.

Particular embodiments may achieve such high operational efficiency with a design in which biasers (e.g., springs) are established externally of the piston containing space, and alongside the piston containing space (as opposed to a design where the spring is established in the piston containing space, and "stacked" end to end with the piston). Biaser(s) that are external of the piston containing space and established alongside such space are the to surround the piston containing space. Typically, in such designs, the spring(s) outside of the piston containing space are in tension (even during full positioner retraction). Also of note is that, as with most other designs, the piston containing space may be established by a block or a cylinder; in either design, the piston containing space may be a cylindrical space within which at least part of the positioner is housed when the apparatus is in the full retraction mode. In "block" designs, as mentioned, the block may house at least two biasers externally of the cylindrical space within which a piston may be housed when the apparatus is in the full retraction mode.

It is of note that, due to manufacturing discrepancies, particularly differences in helical spring length, some springs may start to move (i.e., extend in length if in tension (e.g., external biaser designs), or shorten in length if in compression (e.g., internal biaser designs)) at a pressure that is different from the pressure at which other springs start to move. However, initiation of movement of springs (and thus of the positioners that they bias) preferably occurs at equal pressures, particularly as to position control apparatus of the same zone (where position control apparatus of the same zone are those that are fluidically connected in parallel, or those where one fluidic displacement drives pistons of such "same zone" apparatus). In order to alleviate this problem, there may be provided a spring length adjuster configured to enable adjusting of length of each of the springs (e.g., preferably one for each spring, but perhaps one for each set of springs associated with a single positioner actuator). FIGS. 16A and 16B show examples of an apparatus with a spring length adjuster 153. As shown in these figures, one example of a spring length adjuster that is configured to enable adjusting of length of each springs may involve a threaded bolt established through an end of the part that an end of the spring is attached to (or through the end of the spring itself), such that rotation of the bolt changes the length of the spring. Turning of such bolt may change spring length, and thus enable adjustment of a biaser preload condition. Consequently, manipulating the spring length adjuster may change the drive pressure (effected by the drive system) at which positioner starts, preferably effecting sufficiently simultaneous initiation of movement of all positioners within a zone. For example, where bias force is a tension bias force, if a certain spring is starting too early (i.e., at too low a pressure), the pre-load bias force can be increased by lengthening the spring; if a certain spring is starting too late, the preload bias force can be decreased by shortening the spring. Upon appropriate adjustment (if necessary), the preferred sufficiently simultaneous initiation of movement of all positioners within a zone will occur because all positioners will start moving at a sufficiently identical pressure. It is of note that it is not the case that the only biaser that may benefit from this technology is springs; indeed, other biasers may have their pre-load conditions adjusted (perhaps via volume change in the case of compressed fluid biaser type apparatus).

As mentioned, there are a wide variety of applications of the inventive technology, from side guides for conveyance systems (where such side guides also include neck and shoulder guides); conveyance system guides, non-conveyance systems, tooling guide positioners; positioning systems within hazardous and explosion proof environments; and positioning systems for arrays such as, but not limited to, solar panel arrays and reflecting mirror arrays, in addition to the applications indicated elsewhere in this application. It should be understood that any application requiring precise positioning of a positioner 9 (and perhaps a component connected in some fashion thereto) may benefit from the inventive technology disclosed herein.

As can be easily understood from the foregoing, the basic concepts of the present invention may be embodied in a variety of ways. It involves both position control techniques as well as devices to accomplish the appropriate control. In this application, the position control techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description.

They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "biaser" should be understood to encompass disclosure of the act of "biasing"—whether explicitly discussed or not—and, conversely, were there effectively disclosure of the act of "biasing", such a disclosure should be understood to encompass disclosure of a "biaser" and even a "means for biasing" Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references or other information disclosure statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the biasing devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition and as to computer aspects and each aspect amenable to programming or other electronic automation, the applicant(s) should be understood to have support to claim and make a statement of invention to at least: xvi) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A position control apparatus configured and operable for moving at least one side guide component of an item conveyance system to any of a plurality of component positions, as desired, within a component position range, said apparatus comprising:

a fluidic drive system configured to drive, with a single fluidic displacement, a plurality of positioners in a first relative direction; and a bias system that includes a plurality of biasers that bias said positioners in a direction that is opposite said first relative direction, wherein said bias system includes at least one biaser for every positioner, and wherein said apparatus enables adjustment of said positioners to a plurality of positions within a positioner range, said positioners effecting positioning, as desired, of said at least one side guide component to a desired component position within said component position range.

2. A position control apparatus as described in claim 1 wherein each of said biasers biases a different one of said positioners.

3. A position control apparatus as described in claim 1 wherein said fluidic drive system comprises a plurality of positioner actuators.

4. A position control apparatus as described in claim 3 wherein said biasers comprise springs, each of said positioner actuators have a piston therein, and wherein at least one spring is associated with a respective piston of said positioner actuators and moves along at least one spring axis, each of said at least one spring axis being parallel to a piston axis along which said piston moves.

5. A position control apparatus as described in claim 4 wherein said at least one spring axis is different from said piston axis.

6. A position control apparatus as described in claim 3 wherein each of said biasers is dedicated to a single one of said positioner actuators.

7. A position control apparatus as described in claim 3 wherein said positioner actuators have a +/−0.05 inch accuracy.

8. A position control apparatus as described in claim 3 wherein a majority of said positioner actuators each comprises a cylindrical space having a piston therein.

9. A position control apparatus as described in claim 8 wherein said cylindrical space is established by a cylinder.

10. A position control apparatus as described in claim 8 wherein said cylindrical space is established by an block.

11. A position control apparatus as described in claim 8 wherein each of said majority of positioners is immobile relative to a single one of said pistons.

12. A position control apparatus as described in claim 3 wherein said positioner actuators are linked in parallel and with a fluid compressor.

13. A position control apparatus as described in claim 3 wherein said biasers are established within said positioner actuators.

14. A position control apparatus as described in claim 3 wherein said biasers are established externally of said positioner actuators.

15. A position control apparatus as described in claim 14 wherein said plurality of biasers are springs that act in tension.

16. A position control apparatus as described in claim 3 wherein each of said positioner actuators comprises a cylindrical space having a piston therein.

17. A position control apparatus as described in claim 16 wherein said cylindrical space has at least two biasers established alongside and externally thereof.

18. A position control apparatus as described in claim 17 further comprising an armature of which said at least two biasers form a part, wherein said cylindrical space is established by a cylinder, and wherein said cylinders is retrofitted into said armature.

19. A position control apparatus as described in claim 17 wherein said at least two biasers established around said cylinder are in tension.

20. A position control apparatus as described in claim 17 wherein said at least two biasers established around said cylinder are connected with a positioner associated with said cylindrical space.

21. A position control apparatus as described in claim 17 wherein said at least one of said cylindrical space is established by at least one block.

22. A position control apparatus as described in claim 21 wherein said biasers comprise springs established in at least one block.

23. A position control apparatus as described in claim 21 wherein at least one of said blocks establishes at least three cylindrical spaces, one of which houses a piston, and the remaining of which each houses a different one of said biasers.

24. A position control apparatus as described in claim 21 wherein said at least one of said blocks comprises mounting slots.

25. A position control apparatus as described in claim 1 wherein each of said biasers are independently movable relative to all other biasers.

26. A position control apparatus as described in claim 1 wherein said biasers comprise springs.

27. A position control apparatus as described in claim 26 further comprising at least one spring length adjuster configured to enable adjusting of at least one of said springs.

28. A position control apparatus as described in claim 26 wherein said at least one spring length adjuster comprises at least one bolt connected with said at least one spring.

29. A position control apparatus as described in claim 1 wherein said biasers comprise contained compressible fluid.

30. A position control apparatus as described in claim 1 wherein said contained compressible fluid comprises contained gas.

31. A position control apparatus as described in claim 1 wherein said biasers comprise weighted cams.

32. A position control apparatus as described in claim 1 wherein said biasers comprise electromagnetic devices.

33. A position control apparatus as described in claim 1 wherein said biasers comprise fluid filled elastic containers.

34. A position control apparatus as described in claim 1 wherein each of said biasers exerts a force that relates linearly to a biaser displacement.

35. A position control apparatus as described in claim 1 wherein said fluidic drive system comprises a pneumatic drive system.

36. A position control apparatus as described in claim 1 wherein said fluidic drive system comprises a hydraulic drive system.

37. A position control apparatus as described in claim 1 wherein said fluidic drive system comprises a fluid compressor.

38. A position control apparatus as described in claim 1 further comprising at least one distance sensor established to measure a distance that can be adjusted by said position control apparatus.

39. A position control apparatus as described in claim 38 wherein said at least one distance sensor comprises a plurality of distance sensors.

40. A position control apparatus as described in claim 39 wherein each said distance sensors is dedicated to a one of said positioners.

41. A position control apparatus as described in claim 39 wherein each said distance sensors is dedicated to more than one of said positioners.

42. A position control apparatus as described in claim 38 wherein said at least one distance sensor comprises at least one optical distance sensor.

43. A position control apparatus as described in claim 38 wherein said at least one distance sensor comprises at least one linear transducer.

44. A position control apparatus as described in claim 1 further comprising a PLC configured to adjust said fluidic drive system to adjust at least one of said positioners.

45. A position control apparatus as described in claim 44 wherein said PLC is configured to repetitively adjust said fluidic drive system in response to distance measurements repetitively made with a distance sensor.

46. A position control apparatus as described in claim 1 wherein said fluidic drive system comprises a digital pressure regulator.

47. A position control apparatus as described in claim 1 wherein said at least one side guide component of an item conveyance system comprises at least one side guide of a bottle conveyance system.

48. A position control apparatus as described in claim 1 wherein said at least one side guide component of an item conveyance system comprises at least one side guide of a pallet conveyance system.

49. A position control apparatus as described in claim 1 wherein said plurality of positioners comprise all positioners that are driven with said single fluidic displacement by said fluidic drive system.

50. A position control apparatus as described in claim 1 wherein each of said positioners is capable of travel within only one spatial range during an apparatus setup.

51. A position control apparatus as described in claim 1 further comprising a linkage connected with the positioner.

52. A position control apparatus as described in claim 1 wherein said at least one component comprises a side guide.

53. A position control apparatus as described in claim 1 wherein said apparatus enables adjustment of said positioners to any of an infinite number of positions within said positioner range, said positioners effecting positioning, as desired, of said at least one side guide component to any of an infinite number of side guide component positions.

54. A position control apparatus as described in claim 53 wherein said apparatus is capable of translationally moving said at least one side guide component.

55. A position control apparatus as described in claim 1 wherein said apparatus is capable of translationally moving said at least one side guide component.

56. A position control apparatus as described in claim 1 wherein said plurality of biasers are springs having substantially identical spring constants.

57. A position control apparatus as described in claim 1 wherein said plurality of biasers are springs that act in tension.

58. A position control apparatus as described in claim 1 wherein said plurality of biasers are springs that act in compression.

59. A position control apparatus as described in claim 1 wherein said plurality of biasers are retrofit into position.

60. A position control apparatus as described in claim 1 wherein at least one of said biaser has a fully retracted length of approximately 3 inches, and a fully extended length of approximately 6 inches.

* * * * *